March 29, 1927. 1,622,416
H. R. BURTON
WINDSHIELD CLEARER
Filed March 12, 1925
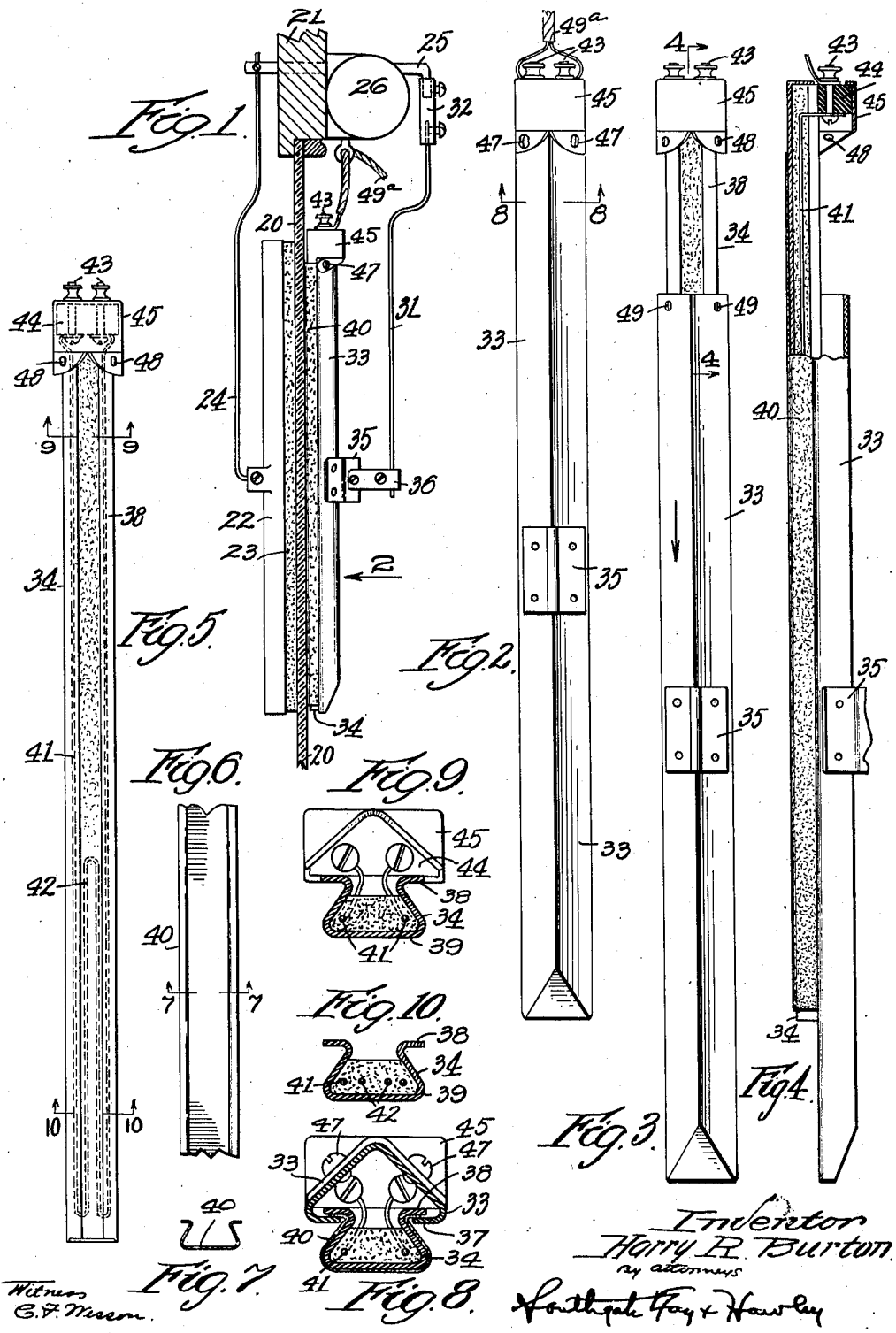

Patented Mar. 29, 1927.

1,622,416

UNITED STATES PATENT OFFICE.

HARRY R. BURTON, OF WORCESTER, MASSACHUSETTS.

WINDSHIELD CLEARER.

Application filed March 12, 1925. Serial No. 15,077.

This invention relates to a device for clearing an automobile windshield or other similar surface of ice or sleet. In winter driving in stormy weather the windshield frequently becomes coated with ice or sleet to an extent which renders it substantially opaque. Driving under these conditions and particularly at night is extremely dangerous unless the windshield is kept open, to the extreme discomfort of the driver. The usual windshield wiping device is useless under these conditions, as it merely slides over the frozen surface without removing any portion of the ice or sleet.

It is the object of my invention to provide a wind-shield clearer which is effective to warm the glass and melt the ice or sleet thereon by intimate contact with the glass at the inner or dry side thereof. The heating device is preferably combined with a wiping member movable over the outer or wet face of the glass and effective to remove the moisture from the glass after the frozen coating has been melted by the heating member. The heating device and the wiping member are preferably aligned with each other and engage substantially opposed surfaces of the glass.

For the best results, it is also desirable to provide some form of automatic mechanism for moving the heating device and the wiping member regularly and uniformly over the selected portion of the glass. By this combination of parts the glass is effectively cleared of sleet and ice and the vision of the driver is unimpaired.

My invention further relates to arrangements and combinations of parts which will be hereinafter described and more particularly pointed out in the appended claims.

A preferred form of the invention is shown in the drawings, in which

Fig. 1 is a sectional elevation of a portion of a wind-shield, with my improved windshield clearer shown in side elevation;

Fig. 2 is a front elevation of the heating device;

Fig. 3 is a view similar to Fig. 2 but showing the parts of the heating device partially separated;

Fig. 4 is a side elevation, partly in section, taken along the line 4—4 in Fig. 3;

Fig. 5 is a plan view of the heating member;

Fig. 6 is a detail view of a portion of the fabric covering therefor;

Fig. 7 is a sectional view of the covering, taken along the line 7—7 in Fig. 6; and Figs. 8, 9 and 10 are transverse sectional views, taken along the line 8—8 in Fig. 2 and the lines 9—9 and 10—10 in Fig. 5 respectively.

Referring to the drawings, I have shown a portion of a windshield glass 20 mounted in a frame 21 and having my improvements applied thereto. My improved windshield clearer comprises an outer wiping member 22 which may be of any usual form and is commonly provided with a rubber glass-engaging wiping element 23 or with some suitable equivalent therefor. A spring arm 24 pivotally supports the wiping member 22 and presses the same yieldingly against the glass 20. The arm 24 is fixed in a rock shaft 25 which has a bearing at the top of the windshield and is preferably oscillated automatically by an actuating device 26, which may be of any of the usual motor-actuated types commonly in use.

The heating device 30 engages the inner or dry face of the glass 20 and is supported by a spring arm 31 which is connected by a coupling 32 to a down-turned portion of the rock shaft 25. The heating device engages the inner side of the glass in substantial alignment with the wiping member 22 and is swung back and forth over the glass in unison therewith.

The heating device comprises a frame member 33 and a heating member 34. The frame member 33 is provided with an attaching plate 35 pivoted to a clamp 36 on the spring arm 31. The frame member 33 is also provided with inturned flanges 37 adapted to receive similar out-turned flanges 38 formed on the casing 39 of the heating member 34. This casing is preferably of thin sheet metal, such as aluminum.

A strip 40 (Fig. 6) of thin non-abrading covering material, such as asbestos fabric, is secured over the casing 39 and the edges thereof are clamped between the flanges 37 and 38. This covering 40 is provided merely to prevent direct sliding contact of the metal casing 39 of the heating member 34 with the glass 20. It performs no wiping function, as it engages only the dry side of the glass.

When the strip 40 becomes worn, the heating member 34 and strip 40 may be slipped longitudinally out of the frame member 33, as indicated in Figs. 3 and 4 and a new strip of covering material may be easily inserted.

A heating element or resistance wire 41 in the heating member 34 is positioned closely adjacent the flat outer surface of the casing 39 and is preferably provided with a return loop 42 at its outer end. This return loop provides an increased supply of heat at the outer end of the heating member where the heating device traverses a longer arc and is thus required to remove an increased amount of ice or sleet.

The heating element 41 is preferably embedded in asbestos or other suitable insulating material, preventing direct contact with the casing 39 of the heating member 34. The ends of the heating element 41 are connected to binding screws 43 mounted in a block of insulating material 44 secured to a head or projection 45 of the casing 39 of the heating member 34. Screws 47 extend through holes 48 in the head 45 into threaded holes 49 in the frame member 33 and thus retain the parts in assembled relation. A heating current of electricity is brought to the terminals 43 by a flexible conducting cord 49ª (Fig. 1). While the casing 39 is preferably of metal protected by a strip 40, the casing may be of thin vulcanized fibre or other similar material, in which event the covering 40 may be omitted.

Having thus described my invention, the purposes and advantages thereof will be readily apparent. The heating element 41 is closely adjacent to the casing 39 of the heating member 34 and this casing is separated from the glass only by the thin strip of non-abrading covering material 40, which is provided to prevent scratching of the glass by direct contact with the casing. The covering strip also assists in the transfer of heat to the glass by reason of the better contact which is made between the glass and the fabric surface.

When the clearer is in operation, the heat from the element 41 is conducted with very little loss to the inner or dry side of the glass 20, thus quickly softening and melting the ice or sleet on the outer side of the glass at the point opposite the heating device. As soon as the ice or sleet is thus melted, it is engaged by the wiping member 22 and is removed from the glass before it can again freeze thereon. A considerable thickness of ice can thus be removed and when the glass is once cleared it is very easily maintained in cleared condition. The only part of the device subject to material wear is the covering strip 40, which may be easily removed and replaced as previously described.

Having thus described my invention and the advantages thereof, I do not wish to be limited to the details herein disclosed otherwise than as set forth in the claims, but what I claim is:—

1. In a windshield clearer, a heating device comprising a swingingly mounted frame member, a heating member slidably mounted in said frame member, said frame member and heating member having interlocking portions, and a thin glass-engaging covering for said heating member clamped in position by said interlocking portions.

2. In a windshield clearer, a heating device comprising a swingingly mounted frame member, a heating member slidably mounted in said frame member, said frame member having in-turned longitudinal flanges, and said heating member having out-turned longitudinal flanges fitting therein and slidably removable therefrom, and a thin non-abrading glass-engaging covering for said heating member clamped between said flanges.

3. In a windshield clearer, a heating device comprising a swingingly mounted frame member, a heating member slidably mounted in said frame member, said frame member having in-turned longitudinal flanges and said heating member having out-turned longitudinal flanges fitting therein and slidably removable therefrom, said frame member and said heating member being made of thin sheet metal, and a thin covering of asbestos fabric protecting the face of said heating member and clamped between said flanges.

4. A wind-shield clearer comprising a heating device engaging the inner dry side of the glass, a wiping member engaging the outer wet side of the glass, and means to move said device and member over the glass, said heating device having a swingingly mounted frame, and a heating element mounted therein, said element being positioned closely adjacent the glass and being removable as a unit from said frame, and said heating element having also a very thin non-abrading strip of covering material interposed between said heating element and the glass.

5. A wind-shield clearer comprising an actuating element mounted for angular movement, means to oscillate said actuating element, a frame member mounted to swing with said actuating element, a heating member slidably mounted in said frame member, said frame member having in-turned longitudinal flanges and said heating member having out-turned longitudinal flanges fitting therein and slidably removable therefrom, and electrical connections to said heating member.

In testimony whereof I have hereunto affixed my signature.

HARRY R. BURTON.